United States Patent
Kim

(10) Patent No.: US 7,469,762 B2
(45) Date of Patent: Dec. 30, 2008

(54) EXTERIOR AIR INTAKE SYSTEM FOR AN ENGINE COMPARTMENT OF A VEHICLE

(75) Inventor: Ki Chang Kim, Suwon (KR)

(73) Assignee: Hyundai Motor Company, Seoul (KR)

( * ) Notice: Subject to any disclaimer, the term of this patent is extended or adjusted under 35 U.S.C. 154(b) by 110 days.

(21) Appl. No.: 11/590,634

(22) Filed: Oct. 31, 2006

(65) Prior Publication Data

US 2007/0272197 A1      Nov. 29, 2007

(30) Foreign Application Priority Data

May 24, 2006   (KR)   ...................... 10-2006-0046701

(51) Int. Cl.
*B60K 11/00* (2006.01)
(52) U.S. Cl. .................. 180/68.1; 180/68.3; 123/184.57
(58) Field of Classification Search .................. 180/190, 180/68.1, 68.3, 68.4, 291, 69.25, 68.2; 123/184.57, 123/559.1, 563, 198 E; 293/113
See application file for complete search history.

(56) References Cited

U.S. PATENT DOCUMENTS

| | | | | | |
|---|---|---|---|---|---|
| 5,062,496 | A | * | 11/1991 | Fukada et al. | 123/198 E |
| 5,195,484 | A | * | 3/1993 | Knapp | 123/198 E |
| 5,251,712 | A | * | 10/1993 | Hayashi et al. | 180/68.3 |
| 5,337,724 | A | * | 8/1994 | Arakawa et al. | 123/563 |
| 5,448,982 | A | * | 9/1995 | Arakawa et al. | 123/559.1 |
| 5,660,243 | A | * | 8/1997 | Anzalone et al. | 180/68.1 |
| 5,775,450 | A | * | 7/1998 | Porter et al. | 180/68.1 |
| 5,860,685 | A | * | 1/1999 | Horney et al. | 180/68.1 |
| 6,035,955 | A | * | 3/2000 | Suzuki et al. | 180/68.1 |
| 6,155,335 | A | * | 12/2000 | Acre et al. | 180/68.1 |
| 6,619,415 | B1 | * | 9/2003 | Hasumi et al. | 180/68.1 |
| 6,901,890 | B2 | * | 6/2005 | Sato | 123/198 E |
| 7,114,586 | B2 | * | 10/2006 | Uozumi | 180/68.1 |
| 7,303,042 | B2 | * | 12/2007 | Kanehira et al. | 180/291 |
| 2003/0029852 | A1 | * | 2/2003 | Ozawa et al. | 219/205 |
| 2006/0162977 | A1 | * | 7/2006 | Etou | 180/190 |
| 2007/0131189 | A1 | * | 6/2007 | Shinada et al. | 123/184.57 |

FOREIGN PATENT DOCUMENTS

| | | |
|---|---|---|
| JP | 2001-080370 | 3/2001 |
| JP | 2006-046215 | 2/2006 |

* cited by examiner

*Primary Examiner*—Hau V Phan
(74) *Attorney, Agent, or Firm*—Morgan, Lewis & Bockius LLP

(57) ABSTRACT

The invention provides for an exterior air intake system in an engine compartment of a vehicle wherein the exterior air can be guided smoothly into an air cleaner. The engine compartment of a vehicle includes: a front-end module that is separated from an engine by a predetermined distance and that is disposed to a front end of a vehicle body; an air cleaner that is positioned near to a side of the engine; a first air duct that connects the air cleaner to the engine; and a second air duct for guiding an exterior air into the air cleaner, wherein the first end of the second air duct is connected to the air cleaner and the second end of the second air duct is positioned to a center of an upper portion of the front-end module.

4 Claims, 5 Drawing Sheets

EXTERIOR AIR INTAKE SYSTEM FOR AN ENGINE COMPARTMENT OF A VEHICLE

CROSS-REFERENCE TO RELATED APPLICATION

This application claims priority to Korean Patent Application No. 10-2006-0046701 filed in the Korean Intellectual Property Office on May 24, 2006, the disclosures of which are incorporated herein by reference.

BACKGROUND OF THE INVENTION (a) Field of the Invention

The present invention relates to an engine compartment of a vehicle. In particular, the present invention relates to an exterior air intake system of an engine compartment in a vehicle.

(b) Description of the Related Art

In general, the engine and its parts relating to the engine (a battery, an air cleaner, etc.) are mounted in the engine compartment of a vehicle. In particular, the vehicle engine contains a front-end module which is positioned in front of the vehicle body. The front-end module supports the condenser.

Furthermore, the engine compartment of the vehicle typically has a battery and an air cleaner disposed in the same space and the exterior air flows into an air duct of the air cleaner through the side of the front-end module. In addition, the battery is disposed on the front side member due to the air cleaner which is disposed in the same space.

Additionally, a booming noise may be generated due to the off-set battery while the vehicle is driving.

In addition, the intake port of the air duct is positioned to the side of the front-end module. The exterior air may be prevented from flowing into the intake port due to a head lamp that is disposed on the side of the front-end module.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention provides an exterior air intake system for an engine compartment of a vehicle in which the exterior air is guided smoothly into an air cleaner, and an air duct and a battery are optimally mounted within the engine compartment.

An engine compartment of a vehicle according to an embodiment of the present invention includes: a front-end module that is separated from an engine by a predetermined distance and is disposed on the front end of a vehicle body; an air cleaner that is positioned near to the side of the engine; a first air duct that connects the air cleaner to the engine and; a second air duct for guiding exterior air into the air cleaner, wherein a first end of the second air duct is connected to the air cleaner and the second end of the second air duct is positioned to the center of an upper portion of the front-end module.

In addition, the engine compartment may further include an intake cover that is disposed on the center of an inner surface of the upper portion of the front-end module. The intake cover has a first predetermined length along the width of the vehicle body, while the second end of the second air duct may be connected to the intake cover.

In addition, the front-end module may include: a front-end upper member on which the intake cover is disposed on the inner surface thereof and; a front-end lower member that is positioned under the front-end upper member and that supports a condenser. An intake port may be formed lengthwise on the front-end upper member of the vehicle body such that the exterior air flows into the intake cover.

In addition, the intake cover may be formed on the front-end upper member as one body.

In addition, the intake port of the front-end upper member may have a second predetermined length along the width of the vehicle body as to correspond to the intake cover.

In addition, the intake port may include: a center port that is formed at the center of the front-end upper member; a left side port that is formed to the left side with respect to the center portion of the front-end upper member and; a right side port that is formed to the right side with respect to the center portion of the front-end upper member.

In addition, a plurality of vertical cross ribs may be respectively disposed on the left side port and the right side port.

In addition, an exit port may protrude from a side surface of the intake cover as to be connected to the second end of the second air duct, and the exit port of the intake cover and the second end of the second air duct are coupled to each other by a band.

In addition, the engine compartment may further include a battery, wherein in the battery may be positioned to the right side with respect to the engine when facing the vehicle from the front side, and the air cleaner may be positioned to the left side with respect to the engine when facing the vehicle from the front side.

DESCRIPTION OF REFERENCE NUMERALS INDICATING PRIMARY ELEMENTS IN THE DRAWINGS

| | |
|---|---|
| 10: engine | 20: vehicle body |
| 100: front-end module | 200: battery |
| 300: air cleaner | 500: first air duct |
| 700: second air duct | 800: band |
| 900: intake cover | |

DETAILED DESCRIPTION OF THE EMBODIMENT

The present invention will now be described more fully hereinafter with reference to the accompanying drawings, in which a preferred embodiment of the invention is shown. As those skilled in the art would realize, the described embodiment may be modified in various different ways, all without departing from the spirit or scope of the present invention.

Figure 1:
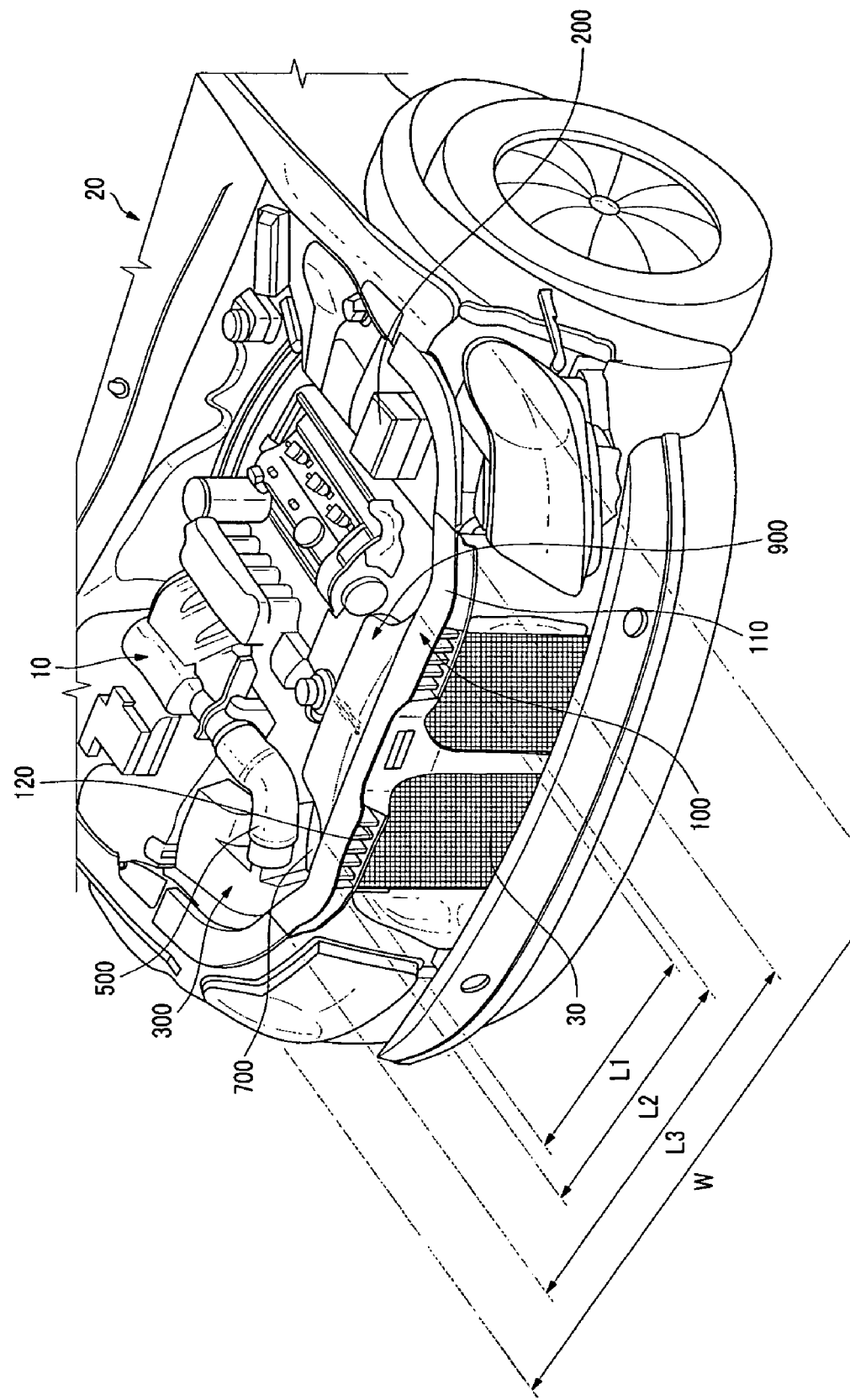
FIG. 1 is a perspective view showing an engine compartment of a vehicle according to an exemplary embodiment of the present invention.
Figure 2:
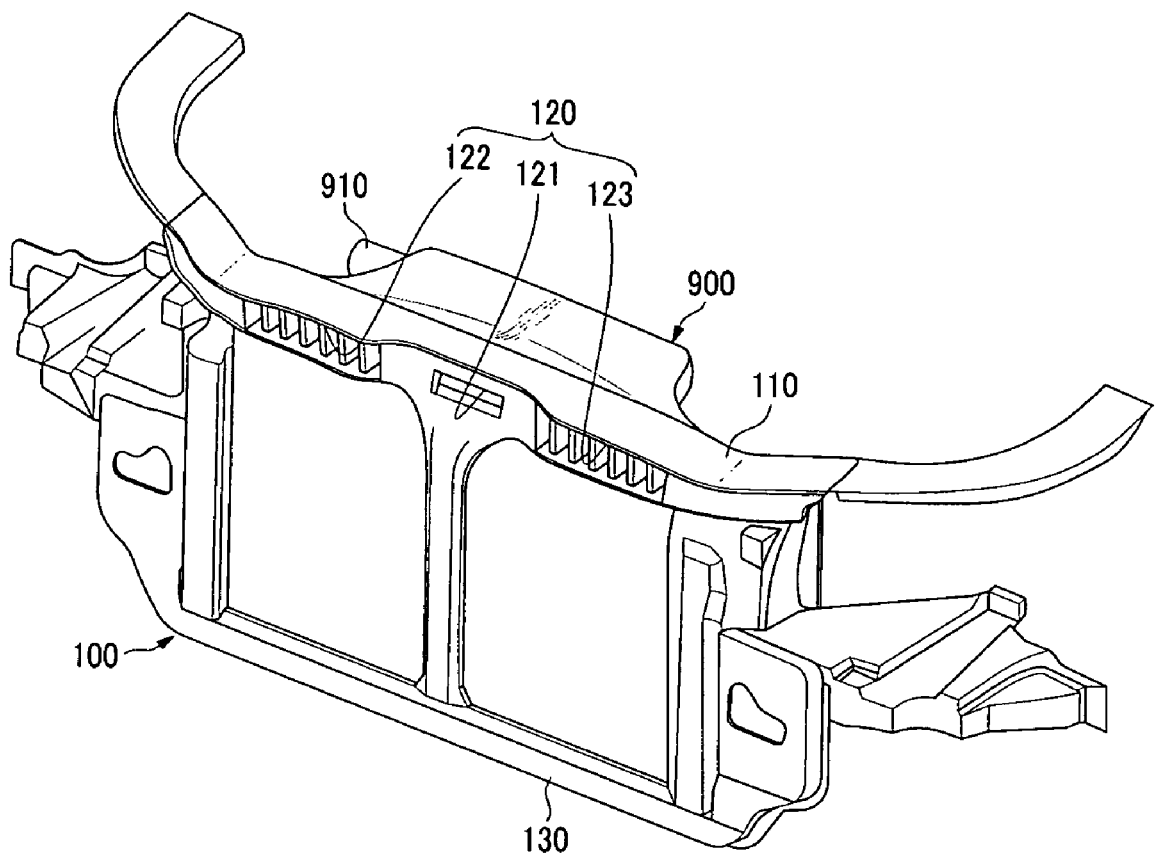
FIG. 2 is a perspective view showing a front-end module on which the intake cover is disposed, in the engine compartment of a vehicle according to the exemplary embodiment of the present invention.
Figure 3:
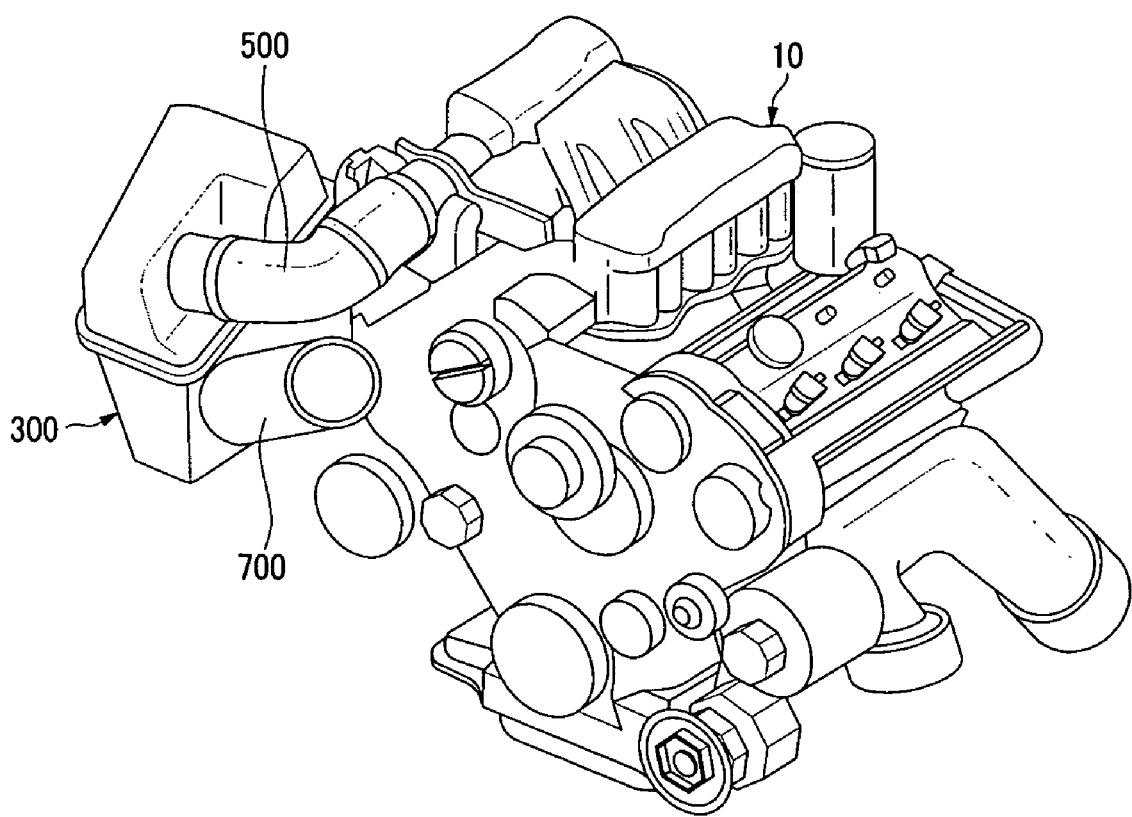
FIG. 3 is a perspective view showing a state in which an air cleaner is positioned to the side of an engine in the engine compartment of a vehicle according to the exemplary embodiment of the present invention.

FIG. 1 is a perspective view showing an engine compartment of a vehicle according to an exemplary embodiment of the present invention. FIG. 2 is a perspective view showing a front-end module on which the intake cover is disposed. FIG. 3 is a perspective view showing a state in which an air cleaner is positioned to a side of an engine.

An engine compartment of a vehicle according to an exemplary embodiment of the present invention, as shown in FIG. 1, includes a front-end module 100, an air cleaner 300, a first air duct 500, and a second air duct 700.

The front-end module 100, as shown in FIGS. 1 and 2, is separated from an engine 10 by a predetermined distance and is disposed to a front end of a vehicle body 20. The front-end module 100 protects the front area of the vehicle body 20 from an exterior impact.

The air cleaner 300, as shown in FIGS. 1 and 3, is positioned near to the side of the engine 10. The air cleaner 300 purifies the exterior air flowing into the engine 10.

The first air duct 500 connects the air cleaner 300 to the engine 10, and the second air duct 700 is connected to the air cleaner 300 as to guide the exterior air into the air cleaner 300.

In particular, the first end of the second air duct 700 is connected to the air cleaner 300, and the second end of the second air duct 700 is positioned to the center of an upper portion of the front-end module 100 such that the exterior air smoothly flows into the second air duct 700.

As shown in FIGS. 1 and 2, the engine compartment of a vehicle according to the exemplary embodiment of the present invention may further include an intake cover 900 that is disposed at a center of an inner surface of the upper portion of the front-end module 100. Such an intake cover 900 may have a first predetermined length L1 along the width W of the vehicle body 20. In particular, in order to minimize turbulence when the exterior air flows into the second air duct 700 through the intake cover 900, the first predetermined length L1 may be longer than a quarter of the width W of the vehicle and may be shorter than a length L3 of a front-end upper member 110 that will be described later. In addition, as shown in FIGS. 4 and 5, the second end of the second air duct 700 is connected to a side surface of the intake cover 900 in order to guide the exterior air that flows into the intake cover 900 into the air cleaner 300.

The front-end module 100, as shown in FIG. 2, may include the front-end upper member 110 and a front-end lower member 130. The intake cover 900 is disposed on an inner surface thereof of the front-end upper member 110 and protects the upper part of the front area of the vehicle body 20. The front-end lower member 130 protects the lower part of the front area of the vehicle body 20. In addition, the front-end upper member 110 and the front-end lower member 130 support the condenser (See "30" of FIG. 1).

Figure 4:
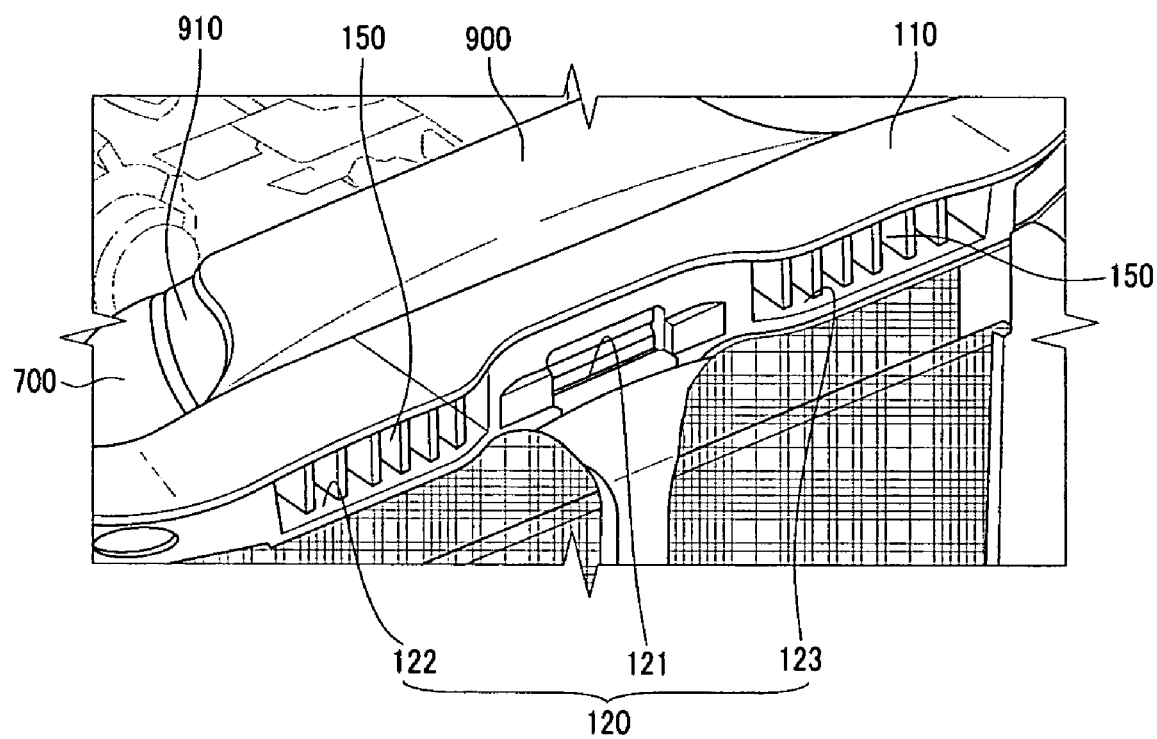
FIG. 4 is a perspective view showing a front-end upper member on which the intake cover is disposed in the engine compartment of a vehicle according to the exemplary embodiment of the present invention.
Figure 5:
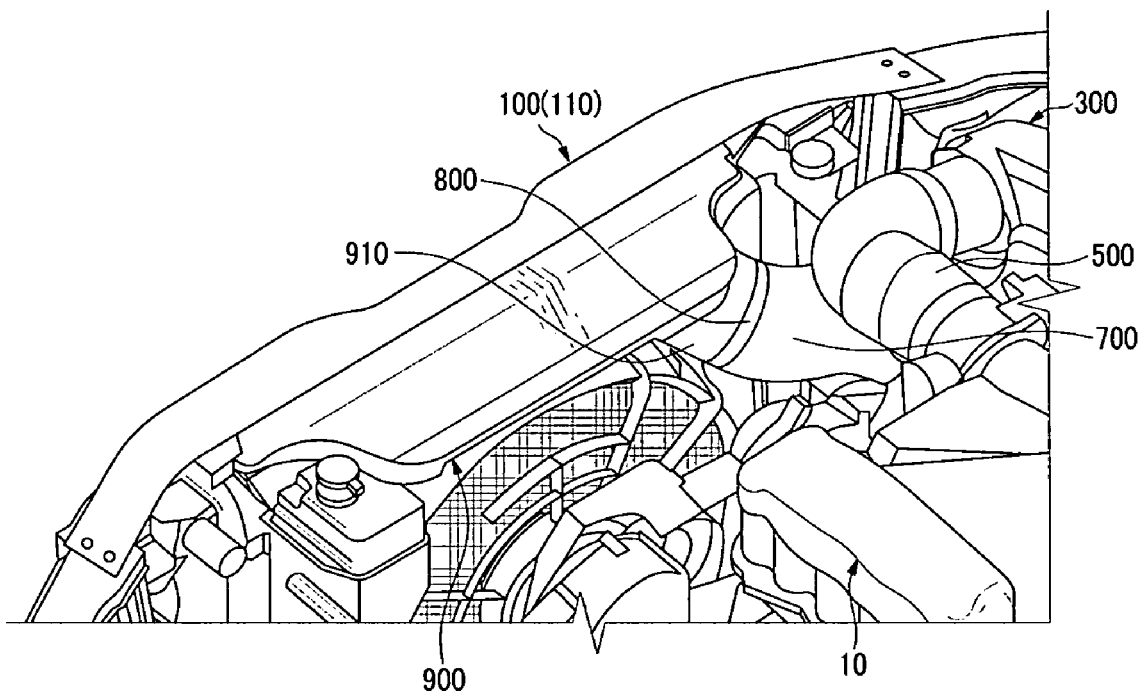
FIG. 5 is a perspective view showing a state in which the intake cover is connected to a second air duct, in the engine compartment of a vehicle according to the exemplary embodiment of the present invention.

In particular, as shown in FIGS. 1 and 4, an intake port 120 is formed to the front-end upper member 110 lengthwise of the vehicle body 20 such that the exterior air flows into the intake cover 900. The intake port 120 guides the exterior air into the intake cover 900.

In particular, the intake port 120 may, as shown in FIG. 1, have a second predetermined length L2 along the width of the vehicle body 20 as to correspond to the intake cover 900. Such a second predetermined length L2 may be longer than the above-mentioned first predetermined length L1 but may be shorter than the length L3 of the front-end upper member 110, such that the exterior air smoothly flows into the intake cover 900 and is not interrupted by the intake port 120.

In addition, the intake port 120, as shown in FIG. 4, may include a center port 121 that is formed at a center portion of the front-end upper member 110, a left side port 122 that is formed to the left side with respect to the center portion of the front-end upper member 110, and a right side port 123 that is formed to the right side with respect to the center portion of the front-end upper member 110.

In particular, as shown in FIG. 4, a plurality of vertical cross ribs 150 may be respectively disposed on the left side port 122 and the right side port 123 as to increase rigidity of the front-end upper member 110.

In addition, the intake cover 900 may be supplied after being formed on the front-end upper member 110 as one body. Thus, the vehicle assembling process is simplified.

In addition, as shown in FIG. 5, an exit port 910 may protrude from the side surface of the intake cover 900 as to be connected to the second end of the second air duct 700, and the exit port 910 of the intake cover 900 and the second end of the second air duct 700 may be coupled to each other by a band 800. Accordingly, a coupling force between the intake cover 900 and the second air duct 700 is guaranteed by the band 800.

The engine compartment of a vehicle according to the exemplary embodiment of the present invention may further include a battery 200, as shown in FIG. 1. The battery 200 may be positioned to the right side with respect to the engine 10 and the air cleaner 300 may be positioned to the left side with respect to the engine 10. In particular, since the battery 200 and the air cleaner 300 are positioned on opposite sides with respect to the engine 10, a mounting place of the battery 200 is guaranteed, and consequently, the battery 200 can be finely disposed to the corresponding place (e.g., a front-side member) without being biased. As a result, a booming noise, which may be generated by a bias of the battery 200 is prevented when the vehicle is in motion.

As is explained, the engine compartment of a vehicle according to the exemplary embodiment of the present invention may have the following advantages.

According to the exemplary embodiment of the present invention, an intake cover is provided and an intake port is formed at the front-end upper member as to secure a desirable open space, and minimize turbulence, which may be generated when the exterior air flows into a second air duct. As a result, the noise due to the intake of the exterior air can be minimized.

In addition, since an air cleaner is positioned to an opposite side of the battery with respect to the engine, the mounting place of the battery can be secured, and accordingly, the battery can be finely disposed on the corresponding place without being biased. As a result, the booming noise is prevented from occurring while a vehicle is in motion.

While this invention has been described in connection with what is presently considered to be a practical exemplary embodiment, it is to be understood that the invention is not limited to the disclosed embodiment, but, on the contrary, is intended to cover various modifications and equivalent arrangements included within the spirit and scope of the appended claims.

What is claimed is:

1. An engine compartment of a vehicle comprising:
a front-end module that is separated from an engine by a predetermined distance and that is disposed on a front end of a vehicle body, wherein the front-end module comprises:
   a front-end upper member disposed at a center of an inner surface of an upper portion of the front-end module: and
   a front-end lower member that is positioned under the front-end upper member and supports a condenser,
an intake cover that is disposed on an inner surface of the front end upper member, and has a first predetermined length along the width of the vehicle body;
an intake port on the front-end upper member having a second predetermined length along the width of the vehicle body which corresponds to the intake cover along a lengthwise direction along the vehicle body such that exterior air flows into the intake cover, wherein the intake port comprises:
   a center port that is formed at a center of the front-end upper member;
   a left side port that is formed to a left side with respect to the center of the front-end upper member; and
   a right side port that is formed to a right side with respect to the center of the front-end upper member;
   wherein a plurality of vertical cross ribs are respectively disposed on the left side port and the right side port;
an air cleaner that is positioned near to a side of the engine;
a first air duct that connects the air cleaner to the engine; and
a second air duct for guiding the exterior air into the air cleaner, wherein
the first end of the second air duct is connected to the air cleaner, and
the second end of the second air duct is connected to the intake cover.

2. The engine compartment of claim 1, wherein the intake cover is formed on the front-end upper member as one structure.

3. The engine compartment of claim 1, wherein:
an exit port protrudes from a side surface of the intake cover which is connected to the second end of the second air duct; and
the exit port of the intake cover and the second end of the second air duct are coupled to each other by a band.

4. The engine compartment of claim 1 further comprising a battery, wherein:
the battery is positioned to a right side with respect to the engine when facing a vehicle from a front side; and
the air cleaner is positioned to a left side with respect to the engine when facing a vehicle from the front side.

* * * * *